United States Patent
Bülow

(10) Patent No.: US 6,735,351 B2
(45) Date of Patent: May 11, 2004

(54) FAST-ADAPTING PMD COMPENSATOR

(75) Inventor: Henning Bülow, Kornwestheim (DE)

(73) Assignee: Alcatel, Paris (FR)

( * ) Notice: Subject to any disclaimer, the term of this patent is extended or adjusted under 35 U.S.C. 154(b) by 145 days.

(21) Appl. No.: 10/115,927

(22) Filed: Apr. 5, 2002

(65) Prior Publication Data

US 2002/0159670 A1 Oct. 31, 2002

(30) Foreign Application Priority Data

Apr. 28, 2001 (DE) .......................... 101 21 025

(51) Int. Cl.$^7$ ................................. G02B 6/00
(52) U.S. Cl. ..................... 385/11; 385/24; 385/29; 359/499
(58) Field of Search ..................... 385/11, 24, 29; 359/499

(56) References Cited

U.S. PATENT DOCUMENTS 6,459,830 B1 * 10/2002 Pua et al. ..................... 385/24
2001/0028760 A1 * 10/2001 Yaffe .......................... 385/27

OTHER PUBLICATIONS

T. Ozeki et al: "Adaptive equalization of polarization–mode dispersion", Techn. Dig. OFC'93, W19, 1993, pp. 143–144.
L.Moeller, et al.: "Broadband PMD Compensation in WDM Systems". ECOC 2000, Sep. 3–7, Munich, Germany, 2000, P 1.15. pp. 159–160.
F. Heismann et al.: "Automatic compensation of first–order polarization mode dispersion in a 10 Gb/s transmission system", proc. ECOC'98, WdC11, 1998.

F. Roy et al., "A Simple dynamic polarization mode dispersion compensator", Techn. Dig. OFC/IOOC'99, 1999, TuS4 pp. 275–278.

* cited by examiner

Primary Examiner—Akm Enayet Ullah
Assistant Examiner—Sung Pak
(74) Attorney, Agent, or Firm—Sughrue Mion, PLLC

(57) ABSTRACT

An amplifier system for satellites, in particulars for radio-frequency amplifier systems incorporating travelling wave tube amplifiers and used in space repeaters. The amplifier system includes two amplifier modules, a signal divider, and a signal combiner. A first output of the divider is connected to an input of the first amplifier module via a connection length $Le_1$. A second output of the divider is connected to input of the second amplifier module via a connection length $Le_2$. An output of the first amplifier module is connected to a first input of the combiner via a connection length $Ls_1$. An output of the second amplifier module is connected to a second input of the combiner via a connection length $Ls_2$. The connection lengths satisfy the equation $Le_1+Ls_1=Le_2+Ls_2$ and the connection length $Ls_1$ is different from the connection length $Ls_2$.

18 Claims, 1 Drawing Sheet

FAST-ADAPTING PMD COMPENSATOR

BACKGROUND OF THE INVENTION

Figure 1:
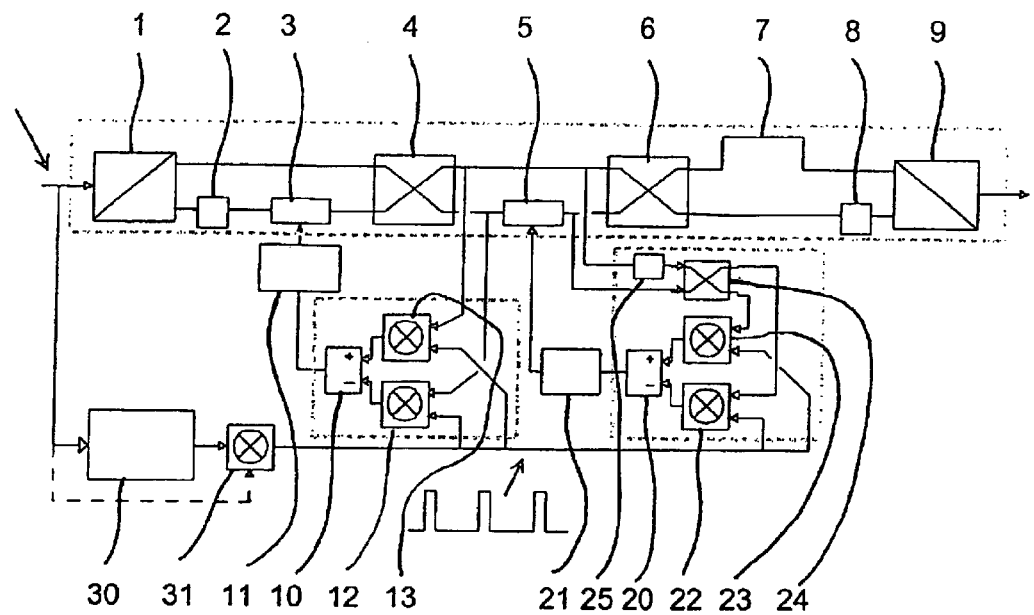

The invention is based on a priority application DE 101 21 025.6 which is hereby incorporated by reference.

The invention relates to a method and a device for adjusting the polarization of an incoming optical signal to a defined polarization state using modulated-up data, with a polarization divider, which processes the incoming optical signal such that two optical signals with orthogonal polarization states are present at its output, with a series-connected first phase setter in the signal path of at least one of the two output signals from the polarization divider, with a first optical coupler, which distributes the light of the two output signals respectively in roughly equal parts to two outputs, with a second phase setter in the signal path of at least one of the two output signals from the first optical coupler, and with a series-connected second optical coupler, an actuating signal being supplied to the first and second phase setter respectively in a feedback loop, said actuating signal being obtained from a quality signal derived from the processed optical signal.

A method of this kind is known for example from the conference papers of T. Ozeki and T. Kudo, "Adaptive equalization of polarization-mode dispersion", Techn. Dig. OFC'93, W19, 1993, pp. 143–144 or by L. Möller, "Broadband PMD Compensation in WDM Systems", proc. ECOC 2000, Sep. 3–7, Munich, Germany, 2000, P 1.15.

Electromagnetic waves in the frequency range of visible light are frequently used today to transmit signals, in particular data signals. In this case, as known from high-frequency engineering in the radio wave range, a data signal is modulated onto a carrier signal. On the optical transmission path, which normally comprises mirrors, optical fibres and other dispersive elements, distortions of the optical signal transmitted occur that can lead to a corruption of or fault in the data transmitted. Such distortions derive for example from chromatic dispersion or also from polarization mode dispersion (=PMD).

In systems with 40G channel rate transmission over connection lengths of several hundred kilometers, for example, operators of optical communications networks are now using very many optical fibres with such a high PMD that dispersion compensation with the features described at the beginning is essential. This is normally realized by a dispersion compensator installed on the receiver side in the transmission network.

Thus in the article by L. Möller quoted at the beginning, a PMD compensator is described for example that can compensate at least partly for distortions on the receiver side owing to PMD effects.

Hitherto only effects of a first and at best low orders can be processed using these known compensators.

Simple arrangements such as described for example in F. Heismann et al., "Automatic compensation of first-order polarization mode dispersion in a 10 Gb/s transmission system", proc. ECOC'98, WdC11, 1998, and in F. Roy et al., "A simple dynamic polarization mode dispersion compensator", Techn. Dig. OFC/IOOC'99, 1999, TuS4, only compensate for first-order PMD. Thus fibre PMD can be compensated for a maximum of roughly 35% of the bit duration. This value (35 ps for 10 Gb/s) will be too small in particular for 40 Gb/s systems, as it signifies a PMD of only 8.8 ps.

If this PMD limit value is exceeded, then distortions of a so-called higher order occur. Initial equalizer arrangements for even higher PMD orders are described for example in the article by L. Möller quoted above. On the one hand, it is evident that as the orders increase, the outlay on signal processing increases sharply, and on the other hand, sufficiently swift adaptation of such an arrangement with many free parameters is not guaranteed.

The methods defined above and related devices can be used as circuits for adjusting the polarization even of non-PMD-distorted optical signals, which therefore arrive only with one defined polarization state. A disadvantage of the solutions known from the prior art and described above here is that only a single quality signal is used in each case to optimize several manipulated variables. To adjust the polarization, a sweep method with a maximum search is used in each case here, which on the one hand is unwieldy and on the other hand works imprecisely, as an optical maximum is normally difficult to locate exactly. The known methods are also very time-consuming and require an expensive logic circuit on the apparatus side for control or adjustment purposes.

By comparison, the object of the present invention is to develop a method and a device of the type described at the beginning with the simplest possible means to the effect that only a single related quality signal is used for each manipulated variable, that instead of a maximum search, optimization can be effected by a search for a minimum signal or a balance, that the quality signals used are bipolar and thus carry information regarding the signal direction, that the corresponding adjustment method can be executed more quickly and simply without complicated sweeping ("dithering") of the manipulated variables and that a control logic that is as inexpensive as possible to implement can be used for the feedback.

This object is achieved according to the invention in a manner that is as surprisingly simple as it is effective in that a subtraction element is provided, to which the two parallel optical signals are supplied from a point of their signal paths after the first optical coupler, a bipolar quality signal being obtained in the subtraction element from the difference of the two signals supplied, and that a control element is connected downstream of the subtraction element, which control element generates an actuating signal to one of the phase setters that adjusts the phase setter such that the amount of the quality signal is minimized and in particular adjusted to zero.

Due to the simultaneous and bipolar adaptation of all manipulated variables of the optical processor part of the device according to the invention, it is possible on the one hand to react to changing PMD distortion by orders of magnitude more quickly (in 10 is instead of in 10 ms). The invention also facilitates the adjustment of equalizers of PMD of higher orders (higher number of manipulated variables) if multiple feedbacks are used. The technical structure of the device according to the invention is very compact and can be executed in an integrated optical manner, so that it is suitable for DWDM systems, which require a dedicated PMD compensator for each wavelength. An embodiment of the device according to the invention in which the control element is executed as an integrator, which integrates the quality signal supplied timewise and forwards it as an actuating signal to the phase setter, is particularly preferred. The device according to the invention can thus be executed in a particularly simple and compact technical manner.

The advantages of the present invention can be utilized in one embodiment also for a device with a further phase setter if a second subtraction element with a series-connected second control element is provided that supplies actuating signals for the second phase setter.

A development of this embodiment in which the signals supplied to the first and second subtraction element are tapped at the same points in the signal paths of the parallel optical signals between the first and the second optical coupler or between the second phase setter and the second optical coupler is particularly compact.

An alternative embodiment provides that signal tapping for the two input signals into the first subtraction element takes place from a point in the signal path of both parallel optical signals following the first optical coupler and before the second phase setter or a point between the first and the second optical coupler and signal tapping for the two input signals into the second subtraction element takes place from a point after the second phase setter and before the second optical coupler or a point between the first and the second optical coupler, that a third optical coupler is connected upstream of the two signal inputs into the second subtraction element, and that a phase element is provided in a signal path upstream of the two signal inputs into the third optical coupler for fixed phase displacement of the signal phase, preferably by ŏ/2. Especially accurate adjustment of the two different phase setters can thus be achieved.

An embodiment of the device according to the invention is particularly preferred in which a runtime delay element is provided on an output signal path following the second optical coupler, to which element a polarization combiner or a polarization-maintaining coupling element is connected in series. The incoming optical signal can be PMD-equalized in this way using the device according to the invention, providing the advantages discussed above. One of the most important application possibilities of the invention might lie in this area.

To be able to use the arrangement according to the invention even in the case of very strong PMD distortions, one particularly preferred embodiment of the device according to the invention is distinguished in that at least one correlator is provided that correlates the quality signal from one of the subtraction elements with the input signal of the device and/or with a clock signal derived therefrom.

Alternatively, in a more simply realizable embodiment, at least one correlator can be provided, which correlates the input signals for one of the subtraction elements with the input signal of the device and/or with a clock signal derived therefrom.

In both embodiments it is favourable if at least one correlator has conversion elements for the optical-electrical conversion of its input signals, and that this correlator is also realized as an electrical assembly. Normally the aim will be to implement as few purely optical components as possible in the device and to implement considerably more cheap and compact electrical assemblies for these.

An embodiment of the device according to the invention in which several cascades with further phase setters and further optical couplers are provided is also particularly preferred. This facilitates continuous operation of the arrangement without the necessity of resetting the individual phase setters.

An embodiment is also advantageous in which at least one subtraction element has conversion elements for the optical-electrical conversion of its input signals, and in which this subtraction element is also realized as an electrical assembly. Here too savings can be made with regard to the costs and size of the device by replacing optical components with corresponding electrical ones.

Even greater savings can be achieved with an advantageous development of this embodiment in that the subtraction element has conversion elements for the analog/digital conversion of its optically-electrically converted input signals, and that this subtraction element is also realized as a computer program. The basic functions are thereby executed in software form on a suitable microchip, so that the overall arrangement can be designed extremely compactly.

Falling within the context of the present invention also is a method for adjusting the polarization of an incoming optical signal to a defined polarization state using modulated-up data, with a polarization divider that processes the incoming optical signal such that two optical signals with orthogonal polarization states are present at its output, with a first phase setter connected in series in the signal path of at least one of the two output signals from the polarization divider, with a first optical coupler that distributes the light of the two output signals respectively in roughly equal parts to two outputs, with a second phase setter in the signal path of at least one of the two output signals from the first optical coupler, and with a series-connected second optical coupler, the first and second phase setters being supplied in a feedback loop respectively with an actuating signal that is obtained from a quality signal derived from the optical signal processed.

According to the invention, the method is distinguished in that the difference of the two parallel optical signals is formed from a point of their signal paths after the first optical coupler and a bipolar quality signal is obtained from this, from which signal an actuating signal to one of the phase setters is produced that adjusts the phase setter in a feedback loop such that the amount of quality signal is minimized, and in particular adjusted to zero.

Several feedback signals are thus derived according to the invention instead of a single one and supplied to the feedback loops operating thus. The derived feedback loops are also bipolar. Due to this, the adaptation logic knows the direction in which the manipulated variable has to be changed and can react suitably swiftly. This is facilitated due to the fact that the arrangement of a planarly realizable optical signal processor permits differential signals to branch off following the individual process stages.

A variant of the method according to the invention that is particularly advantageous provides that the bipolar quality signal is integrated timewise and forwarded to the phase setter as an actuating signal. The control apparatus for generating the control signal can thus be realized as a simple integrator.

A method variant in which the quality signal is correlated with the incoming optical signal and/or with a clock signal derived therefrom is also preferred. PMD-equalization can be achieved in this way even with very strongly distorted incoming optical signals.

Furthermore, a method variant in which the two signals branched off from the signal paths from a point following the first optical coupler to obtain the bipolar quality signal are correlated prior to the formation of their difference with the incoming optical signal and/or with a clock signal derived therefrom, is advantageous.

Furthermore, a server unit, a processor assembly and a gate-array assembly for supporting the method according to the invention described above, as well as a computer program for executing the method, fall within the scope of the present invention. The method can be realized both as a hardware circuit and also in the form of a computer program.

Nowadays, software programming is preferred for powerful DSPs, as new knowledge and additional functions are easier to implement by changing the software on an existing hardware base. However, methods can also be implemented as hardware modules in devices for signal transmission, for example in an IP (=Internet Protocol) network or a telecommunications system.

SUMMARY OF THE INVENTION

Further advantages of the invention result from the description and the drawing. The features stated here and referred to further can likewise be used according to the invention individually or in several arbitrary combinations. The embodiments shown and described are not to be understood as an exhaustive list, but are rather of an exemplary character for describing the invention.

The invention is depicted in the drawing and explained in greater detail with reference to practical examples.

Figure 2:
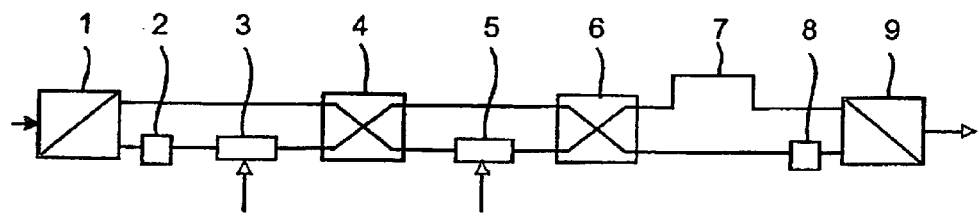

FIG. 1 shows a block diagram of the mode of operation of a PMD compensator that contains an embodiment of the device according to the invention; and FIG. 2 shows a diagram of the mode of operation of a PMD compensator with a device for setting the polarization according to the prior art.

The PMD compensator according to the prior art shown in FIG. 2 comprises a polarization divider 1, into which a normally PMD-distorted optical input signal (indicated by an arrow) is fed. The polarization divider 1 processes the optical input signal such that at its output two optical signals with orthogonal polarization states are present. One of the two output signals from the polarization divider 1 is supplied directly, and the other via a polarization rotator 2 and a first phase setter 3, to a first optical coupler 4, which distributes the light of the two optical signals supplied to it respectively in roughly equal parts to its two outputs.

One output signal path from the first optical coupler 4 is supplied directly, and the second via a second phase setter 5, to the two inputs of a second optical coupler 6. The output signals from the second optical coupler 6 are supplied in turn via a runtime delay element 7 or a further polarization rotator 8 to the two inputs of a polarization combiner 9, the output signal of which is then largely PMD-compensated with appropriate process routing. For this purpose, an actuating signal is supplied respectively to the first phase setter 3 and the second phase setter 5 in a feedback loop, said actuating signal being obtained from a quality signal derived from the optical signal processed.

In FIG. 1, a PMD compensator is shown that comprises an embodiment of the device according to the invention, which in particular improves considerably the mode of operation of the feedback loops of the known optical processor shown in FIG. 2.

For this purpose, the device has a first adaptation correlator, which is constructed from a first subtraction element 10, the two inputs (+/−) of which are fed from two amplitude modulators 12, 13, and the output signal of which is supplied as a bipolar quality signal to a first control element 11, which generates from this an actuating signal to the first phase setter 3, which sets this so that the amount of the quality signal is minimized, in particular adjusted to zero. One amplitude modulator 12 receives for this a signal tapped from the signal path in the optical processor between the first optical coupler 4 and the second phase setter 5, which signal is clocked via a clock pulse recovery facility 30 and an amplitude modulator 31. The inputs of the other amplitude modulator 13 are supplied on the one hand in turn with a clock signal and on the other hand with a signal tapped from the optical path of the other signal output of the first optical coupler 4.

Furthermore, in the embodiment of the device according to the invention shown in FIG. 1, a second adaptation correlator is provided that comprises a second subtraction element 20, the output signal of which is supplied as a bipolar quality signal to a second control element 21, that generates from it in turn an actuating signal, with which the second phase setter 5 is adjusted such that the amount of the quality signal is again minimized and in particular adjusted to zero.

The two inputs of the second subtraction element 20 are supplied by two amplitude modulators 22, 23, that are clocked like amplitude modulators 12, 13 via the clock pulse recovery facility 30 and the amplitude modulator 31. The two other inputs of the amplitude modulators 22, 23 are supplied from the two signal outputs of a third optical coupler 24, which for its part receives at its two inputs an optical signal that is tapped between the second phase setter 5 and the second optical coupler 6, and a signal that is tapped on the other of the two parallel signal paths between the first optical coupler 4 and the second optical coupler 6 and sent through a phase element 25 that is used for the fixed phase displacement of the signal phase, preferably by ŏ/2.

In case of the input of a non-distorted signal that only has one defined polarization state, the circuit according to the invention acts like a polarization setter. The entire optical signal is connected independently of the polarization state to only one waveguide at the output of the second optical coupler 6. The adaptation adjustment would work even without a sampling clock pulse being supplied, so that the modulators can be dispensed with.

The optical power in both coupler outputs is adjusted to an identical value by means of the activatable first phase setter 3 by the first adaptation correlator.

The second adaptation correlator then adjusts the second phase setter 5 in a manner such that the phase difference at the input of the second optical coupler 6 is ŏ/2. Then the entire light couples over namely to just one arm at the output of this coupler. The second adaptation correlator monitors this phase condition with the aid of its optical coupler 24, which is held in quadrature. A 90 degree phase difference signifies for it identical power at both of its output gates.

This arrangement can operate very swiftly, as the two manipulated variables _1 and _2 are adjusted independently of one another at the first or second phase setter 3, 5, and since bipolar signals are present respectively at the output of the adaptation correlators, which signals contain the direction information with regard to their transmission direction in their sign. Time-consuming sweeping ("dithering") to determine an extreme is thus dispensed with.

For PMD-distorted signals, the polarization of the signal changes during a bit. The polarization adjustment described above is therefore limited by the scanning with the clock pulse to just a short section of the incoming optical signal. The signals of the slow and fast PMD axes are then received separately at the two outputs of the second optical coupler 6. The runtime delay element 7, which is normally constructed from a waveguide of a different length compared to the parallel optical path, reduces the runtime difference and the two partial signals are joined together once again equalized on one fibre using the polarization combiner 9.

The optical processor and the optical coupler 24 in the second adaptation correlator can be realized compactly, partly or fully integrated optically in planar technology on a substrate or constructed as micro-beam optics (MOEMS= microoptic electromechanical system).

The correlators can be realized by means of optically triggered sampling circuits (e.g. as an opto-hybrid by means of SOA and passive waveguide structure $SiO_2$ on an Si substrate) or constructed following detection by means of electronic circuits.

For an application as "endless polarization control", another cell consisting of a phase shifter 4 and a further optical 1:1 coupler together with a further adaptation correlator would have to be inserted at the output of the first optical coupler 4.

The optical couplers 4, 6, 24 can be executed as 3 dB waveguide couplers (two singlemode waveguides or as a multimode interference coupler (=MMI)).

The runtime delay element 7 for PMD compensation of the first order produces runtime delays in the order of roughly 0.5 times the bit period (12 ps at 40 Gb/s).

The clock pulse unit 30 supplies suitable optical (or electrical) pulses with the same bit rate or on a subharmonic for the partial signals led out of the optical processor.

The amplitude modulators 12, 13, 22, 23, 31 can be executed as optical gates, e.g. optical sampling circuits with e.g. SOA elements, as used also for optical demultiplexers, or as electronic gates/multipliers (then following detection of the partial signal led out of the processor by means of a photodiode).

What is claimed is:

1. A device for adjusting the polarization of an incoming optical signal to a defined polarization state using modulated-up data, with a polarization divider, which processes the incoming optical signal such that two optical signals with orthogonal polarization states are present at its output, with a series-connected first phase setter in the signal path of at least one of the two output signals from the polarization divider, with a first optical coupler, which distributes the light of the two output signals respectively in roughly equal parts to two outputs, with a second phase setter in the signal path of at least one of the two output signals from the first optical coupler, and with a series-connected second optical coupler, an actuating signal being supplied to the first and second phase setter respectively in a feedback loop, said actuating signal being obtained from a quality signal derived from the processed optical signal, wherein a first subtraction element is provided, to which the two parallel optical signals are supplied from a point of their signal paths after the first optical coupler, a bipolar quality signal being obtained in the first subtraction element from the difference of the two signals supplied, and that a first control element is connected downstream of the first subtraction element, which control element generates an actuating signal to one of the phase setters that adjusts the phase setter such that the amount of the quality signal is minimized and in particular adjusted to zero.

2. A device according to claim 1, wherein the control element is executed as an integrator, which integrates the quality signal supplied timewise and forwards it as an actuating signal to the phase setter.

3. A device according to claim 1, wherein a second subtraction element with series-connected second control element is provided, which supplies actuating signals for the second phase setter.

4. A device according to claim 3, wherein the signals supplied to the first and second subtraction element are tapped at the same points of the signal paths of the parallel optical signals between the first and the second optical coupler or between the second phase setter and the second optical coupler.

5. A device according to claim 3, wherein the signal tapping for the two input signals into the first subtraction element takes place from a point in the signal path of both parallel optical signals following the first optical coupler and before the second phase setter or a point between the first and the second optical coupler and signal tapping for the two input signals into the second substraction element takes place from a point after the second phase setter and before the second optical coupler or a point between the first and the second optical coupler, that a third optical coupler is connected upstream of the two signal inputs into the second substraction element, and that a phase element is provided in a signal path upstream of the two signal inputs into the third optical coupler for fixed phase displacement of the signal phase, preferably by $\check{o}/2$.

6. A device according to claim 1, wherein a runtime delay element is provided in one output signal path following the second optical coupler, to which element a polarization combiner or a polarization-maintaining coupling element is connected in series.

7. A device according to claim 1, wherein at least one correlator is provided, which correlates the quality signal from one of the subtraction elements with the input signal of the device and/or with a clock signal derived therefrom.

8. A device according to claim 1, wherein at least one correlator is provided, which correlates the input signals for one of the subtraction elements with the input signal of the device and/or with a clock signal derived therefrom.

9. A device according to claim 1, wherein several cascades are provided with further phase setters and further optical couplers.

10. A device according to claim 1, wherein at least one subtraction element has conversion elements for the optical-electrical conversion of its input signals, and that this subtraction element is also realized as an electrical assembly.

11. A device according to claim 10, wherein the subtraction element has conversion elements for the analog/digital conversion of its optically-electrically converted input signals, and that this subtraction element is also realized as a computer program.

12. A method for adjusting the polarization of an incoming optical signal to a defined polarization state using modulated-up data, with a polarization divider that processes the incoming optical signal such that two optical signals with orthogonal polarization states are present at its output, with a first phase setter connected in series in the signal path of at least one of the two output signals from the polarization divider, with a first optical coupler that distributes the light of the two output signals respectively in roughly equal parts to two outputs, with a second phase setter in the signal path of at least one of the two output signals from the first optical coupler, and with a series-connected second optical coupler, the first and second phase setters being supplied in a feedback loop respectively with an actuating signal that is obtained from a quality signal derived from the optical signal processed, wherein the difference of the two parallel optical signals is formed from a point of their signal paths after the first optical coupler and a bipolar quality signal is obtained from this, from which signal an actuating signal to one of the phase setters is produced that adjusts the phase setter in a feedback loop such that the amount of quality signal is minimized, and in particular adjusted to zero.

13. A method according to claim 12, wherein the bipolar quality signal is integrated timewise and forwarded to the phase setters as an actuating signal.

14. A method according to claim 12, wherein the quality signal is correlated with the incoming optical signal and/or with a clock signal derived therefrom.

15. A method according to claim 12, wherein the two signals branched off from the signal paths from a point following the first optical coupler to obtain the bipolar quality signal are correlated prior to the formation of their difference with the incoming optical signal and/or with a clock signal derived therefrom.

16. A processor assembly, in particular digital signal processor for supporting the method according to claim 12.

17. A programmable gate array assembly for supporting the method according to claim 12.

18. A computer program for executing the method according to claim 12.

* * * * *